(12) United States Patent
Bastoreala et al.

(10) Patent No.: US 8,573,043 B2
(45) Date of Patent: Nov. 5, 2013

(54) METHOD FOR MONITORING AN SCR CATALYTIC CONVERTER

(75) Inventors: Arthur Bastoreala, Remseck Am Neckar (DE); Alexander Franz, Kornwestheim (DE); Tobias Pfister, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 184 days.

(21) Appl. No.: 13/154,782

(22) Filed: Jun. 7, 2011

(65) Prior Publication Data

US 2011/0296905 A1    Dec. 8, 2011

(30) Foreign Application Priority Data

Jun. 7, 2010    (DE) .......................... 10 2010 029 740

(51) Int. Cl.
*G01M 15/10*    (2006.01)
(52) U.S. Cl.
USPC ...................................................... 73/114.75
(58) Field of Classification Search
USPC .............................. 73/114.69, 114.71, 114.75
See application file for complete search history.

(56) References Cited

U.S. PATENT DOCUMENTS

2010/0242454 A1*    9/2010    Holderbaum .................... 60/301
2010/0326051 A1    12/2010    Busch et al.

* cited by examiner

*Primary Examiner* — Eric S McCall
(74) *Attorney, Agent, or Firm* — Michael Best & Friedrich LLP

(57) ABSTRACT

A method is provided for monitoring an SCR catalytic converter (12), in which method the $NH_3$ storage capacity of the SCR catalytic converter (12) is monitored. The SCR catalytic converter (12) is initially filled in an overdosing phase with a superstoichiometric reducing agent dosing up to the maximum $NH_3$ storage capacity. The catalytic converter is subsequently acted on in an underdosing phase with a reducing agent dosing which is reduced in relation to a normal dosing or is absent. The $NH_3$ storage capacity is indirectly determined during the underdosing phase by determining at least one characteristic value which is dependent on the $NO_x$ conversion rate. According to the invention, to detect $NH_3$ slippage (25), which indicates the transition from the overdosing phase to the underdosing phase, a variable which is characteristic of the NOx conversion is continuously measured during the overdosing phase, and in the event of a fall in the NOx conversion, it is inferred that $NH_3$ slippage (25) is present.

19 Claims, 3 Drawing Sheets

METHOD FOR MONITORING AN SCR CATALYTIC CONVERTER

BACKGROUND OF THE INVENTION

The invention relates to a method for monitoring an SCR catalytic converter, in which an $NH_3$ storage capacity of the SCR catalytic converter is monitored.

Methods and devices for operating an internal combustion engine, in particular in a motor vehicle, in the exhaust-gas region of which is arranged an SCR catalytic converter (Selective Catalytic Reduction) by means of which the nitrogen oxides (NOx) contained in the exhaust gas of the internal combustion engine are reduced in the presence of a reducing agent to form nitrogen, are known. The proportion of nitrogen oxides in the exhaust gas can be considerably reduced in this way. For the reaction to take place, ammonia ($NH_3$) is required, which ammonia is admixed to the exhaust gas. As reactant or reducing agent, therefore, use is made of $NH_3$ or reagents which split off $NH_3$. In general, use is made of an aqueous urea solution which is injected into the exhaust section upstream of the SCR catalytic converter by means of a dosing device. $NH_3$, which acts as reducing agent, is formed from said solution. The dosing of the reducing agent takes place preferably as a function of the nitrogen oxide emissions of the engine, and is therefore dependent in particular on the present speed and torque of the engine.

The basic principle of the SCR catalytic converter is that of the nitrogen oxide molecules being reduced on the catalytic converter surface in the presence of ammonia to form elementary nitrogen. The required dosing rate is determined in an electronic control unit, in which are stored strategies for the operation and monitoring of the SCR system.

Within the context of the so-called on-board diagnosis (OBD), the SCR system must be monitored as a component which is relevant with regard to emissions. Here, the OBD limit values, which are specified usually as a multiple of the legally defined emissions limit values, must be adhered to. With regard to the SCR catalytic converter, it must be ensured that the OBD limit value for nitrogen oxides is adhered to, that is to say the monitoring functions must ensure that, in the event of the corresponding limit value being exceeded, the SCR catalytic converter is identified as being defective.

To measure nitrogen oxide values, an SCR catalytic converter generally comprises at least one NOx sensor. Presently conventional NOx sensors have cross-sensitivity to $NH_3$, such that the sensor signal indicates not exclusively the NOx concentration but rather a summed signal of NOx and $NH_3$. The sensor signal from a NOx sensor arranged downstream of an SCR catalytic converter therefore cannot be assigned unequivocally to the NOx concentration or the $NH_3$ concentration. That is to say, an increase of the sensor signal downstream of the SCR catalytic converter can on the one hand be a sign of an increase in NOx concentration and therefore a decreasing NOx conversion rate in the catalytic converter. On the other hand, an increase in the signal may also indicate a breakthrough of pure ammonia, that is to say an increase in $NH_3$ concentration. A direct distinction is not possible between NOx and $NH_3$. Since ammonia is harmful to health and to the environment in high concentrations, the breakthrough of pure ammonia, so-called $NH_3$ slippage, should as far as possible be prevented.

Of decisive importance for the functioning of the SCR catalytic converter is its storage capacity for $NH_3$. If the $NH_3$ storage capacity is reduced on account of aging of or damage to the catalytic converter, an increased breakthrough or slippage of $NH_3$ may occur, and the conversion of the nitrogen oxides no longer takes place to an adequate extent. Methods for monitoring an SCR catalytic converter are already known in which the storage capacity for $NH_3$ is taken into consideration as a measure of the aging of or damage to the catalytic converter. For example, the laid-open specification DE 10 2007 040 439 A1 describes a method for diagnosing an SCR catalytic converter, downstream of which is connected a nitrogen oxide sensor with cross-sensitivity to ammonia. The SCR catalytic converter is initially filled in an overdosing phase with a superstoichiometric reducing agent dosing up to the maximum $NH_3$ storage capacity, in order to attain a defined starting point for a diagnosis. The attainment of the maximum $NH_3$ storage is detected, on the basis of the breakthrough of pure ammonia downstream of the SCR catalytic converter, as $NH_3$ slippage. The $NH_3$ slippage can be indirectly measured on account of the cross-sensitivity of the nitrogen oxide sensor to $NH_3$. Subsequently, in an underdosing phase with a reducing agent dosing which is reduced in relation to a normal dosing or is absent, the stored $NH_3$ mass is gradually depleted again by the reduction of the nitrogen oxides in the catalytic converter. During said emptying test, the usable $NH_3$ storage capacity can be indirectly determined on the basis of one or more characteristic values which is/are dependent on the NOx conversion rate, because with a lower stored $NH_3$ mass, less NOx can be converted on the catalytic converter surface during the emptying test.

It is important for the described monitoring method that the $NH_3$ slippage is detected in good time in order to be able to switch from the overdosing phase into the underdosing phase and avoid an unnecessary release of ammonia. To detect the $NH_3$ slippage, use has hitherto been made of predefinable thresholds for the SCR efficiency or for the NOx sensor signal downstream of the SCR catalytic converter, which are evaluated under certain monitoring conditions. Here, $NH_3$ slippage is detected if, during the overdosing phase, after a predefinable time, the sensor signal increases above a predefinable threshold or the measured SCR efficiency falls below a predefinable threshold. A problem with defining thresholds is however that, in the case of a threshold with only a small deviation from the normal state, the slippage detection is highly sensitive and there is the risk that even normal fluctuations in the NOx sensor signal downstream of the SCR catalytic converter lead to false detection of $NH_3$ slippage. This would lead to an underestimation of the $NH_3$ storage capacity, and therefore to a false evaluation of the catalytic converter. On the other hand, taking into consideration only large deviations from the normal state increases the reliability of the slippage detection, but in this case the actual $NH_3$ is already very high at the time of slippage detection and falsifies the result of the following emptying test during the underdosing phase, with the SCR efficiency being underestimated. The result in this case, too, can be an incorrect diagnosis. A further disadvantage here is the resulting adverse effect on emissions in particular during the emptying tests, because increased emissions of nitrogen oxides occur as a result of the decreased provision of reducing agent. Furthermore, to condition the SCR catalytic converter for the filling of the $NH_3$ store up to the maximum storage capacity, it is necessary for the $NH_3$ slippage limit to be exceeded. These $NH_3$ emissions are also disadvantageous on account of the environmental impact and the risk to health.

To further improve the monitoring of the SCR catalytic converter, it has already been proposed that the plausibility checking functions be carried out only under certain monitoring conditions. Monitoring processes are limited for example to certain value ranges for one or more of the following variables, which may be modeled or measured, for example with regard to the exhaust-gas mass flow, the exhaust-gas volume flow, the exhaust-gas temperatures, the operating point (speed, injection quantity), the vehicle speed, the ambient pressure, the ambient temperature, NOx, PM, HC, CO or $O_2$ signals, the exhaust-gas recirculation rate, the engine operating mode, the engine status, the engine running time or the engine standstill time. For the diagnosis of the SCR catalytic converter, it is also possible to additionally use the status of the NOx sensors, the actual and nominal filling levels of the reducing agent in the catalytic converter, the regulating error of the $NH_3$ filling level regulator, the status of the reducing agent dosing device, the status/mode of the dosing quantity pilot control, the adaptation factor as a corrective factor for the reducing agent dosing quantity, the status of the dosing quantity adaptation, the status of the diesel particle filter regeneration, the diesel particle filter regeneration demand count, or the status of the HC poisoning. Furthermore, monitoring processes of the SCR catalytic converter may also be carried out under (virtually) steady-state conditions, which may be determined on the basis of one or more of the stated variables.

Despite the restriction of the monitoring conditions, the detection of the occurring $NH_3$ slippage, which indicates that the maximum $NH_3$ storage has been reached at the end of the overdosing phase, remains a problem. The invention is therefore based on the object of improving the $NH_3$ slippage detection as an end point of the overdosing phase, such that the transition from the overdosing phase to the emptying test can be optimized, $NH_3$ emissions can be minimized to the greatest possible extent, and the monitoring is improved overall.

SUMMARY OF THE INVENTION

The method according to the invention is based on the concept of detecting $NH_3$ slippage as soon as it starts to occur by means of a continuous observation and evaluation of the measured NOx conversion during the overdosing phase. It is therefore possible even at very low $NH_3$ concentrations downstream of the SCR catalytic converter for a corresponding status message to be output in a targeted manner. According to the invention, therefore, to detect $NH_3$ slippage, which indicates the transition from the overdosing phase to the underdosing phase, a variable which is characteristic of the NOx conversion is continuously measured during the overdosing phase, and in the event of a fall in the NOx conversion, it is inferred that $NH_3$ slippage is present. This permits a very rapid and early detection of $NH_3$ slippage, such that the occurring $NH_3$ emissions can be kept as low as possible. This is highly advantageous in particular with regard to the adverse health effects of released ammonia, and with regard to possible future legal limitations of $NH_3$ emissions. Furthermore, it is possible in this way to very precisely determine the required characteristic values during the emptying test which follows the overdosing phase during the course of the monitoring of the $NH_3$ storage capacity, because the falsifying effect on the NOx sensor signal downstream of the SCR catalytic converter on account of the cross-sensitivity of the nitrogen oxide sensor to $NH_3$ is minimized, such that significantly more precise and robust monitoring of the SCR catalytic converter is made possible.

The variable which is characteristic of the conversion is preferably determined on the basis of measured values from at least one NOx sensor arranged downstream of the SCR catalytic converter. The efficiency of the SCR catalytic converter is particularly advantageously measured as a characteristic variable. The efficiency may be determined for example on the basis of measured values from a NOx sensor arranged upstream of the SCR catalytic converter and from the NOx sensor arranged downstream of the SCR catalytic converter. It is thus possible in a particularly reliable manner for the NOx conversion to be observed and evaluated during the overdosing phase. It is advantageous here in particular that the efficiency is if appropriate also measured in any case for other purposes, such that this data can be accessed.

In a particularly preferred embodiment of the method according to the invention, during the overdosing phase, the maximum of the measured efficiency of the SCR catalytic converter is continuously determined and, at the same time, the deviation of the presently measured efficiency of the SCR catalytic converter from the maximum value attained up to that time is measured. It is inferred that $NH_3$ slippage is present if the deviation exceeds a predefinable threshold value.

Furthermore, the catalytic converter temperature may be taken into consideration in the evaluation. In particular, the efficiency may be corrected as a function of the present catalytic converter temperature and/or the catalytic converter temperature reached at the start of the overdosing phase, in order to take into consideration the temperature dependency of the maximum attainable SCR efficiency.

In the case of an approximately constant NOx raw emission signal, it is to be expected that the measured SCR efficiency initially increases up to a maximum value, or maintains the present value, during the overdosing phase. Depending on the aging state of or degree of damage to the SCR catalytic converter, the maximum level is maintained for a different length of time. In general, it is true that, the less aged or damaged the catalytic converter is, the longer the maximum value is held. After the maximum $NH_3$ storage capacity is reached, the SCR efficiency falls again as a result of the occurring $NH_3$ slippage, which is jointly measured by the NOx sensor which is cross-sensitive to $NH_3$. If, during a predefinable delay time, the deviation of the present efficiency from the maximum value determined up to that time exceeds a predefinable maximum value, $NH_3$ slippage is detected.

As a prerequisite for the $NH_3$ slippage detection according to the invention, it may also be checked whether the change with respect to time of the NOx mass flow measurable downstream of the SCR catalytic converter lies above a predefinable threshold value, in order that only those changes of the NOx sensor signal downstream of the SCR catalytic converter which are large enough to plausibly represent the excess $NH_3$ mass flow dosed during the overdosing phase after the maximum $NH_3$ storage is reached are interpreted as $NH_3$ slippage. During the overdosing, the $NH_3$ mass flow is comparatively high, such that the $NH_3$ slippage leads to a change in the NOx sensor signal with a comparatively high gradient.

Alternatively or additionally thereto, as a condition, it may be checked whether the NOx mass flows measurable upstream and/or downstream of the SCR catalytic converter lie above a predefinable threshold value. The values should be large enough to eliminate miscalculations on account of sensor or model tolerances. Presently conventional NOx sensors have for example a measurement accuracy of up to 15 ppm. Depending on the NOx raw emissions and emissions limit values, this may lie in the range of the NOx concentrations to be expected downstream of the SCR catalytic converter. The different predefinable threshold values may for example be determined empirically and stored in a control unit. The different threshold values may be updated on demand or at regular intervals.

The evaluation of the method according to the invention is preferably made dependent on whether substantially steady-state NOx raw emissions or dynamically fluctuating NOx raw emissions are present. In the case of substantially steady-state NOx raw emissions, the evaluation may take place directly in the above-described way. Before the corresponding fault diagnosis is carried out, it is preferably checked on the basis of one or more variables whether steady-state conditions are actually present. To evaluate whether steady-state conditions are present, it is possible to evaluate for example the change with respect to time of the exhaust-gas mass flow and/or of the NOx mass flow and/or of engine-related variables, in particular the engine speed and/or the injection quantity. In this way, the present operating state can be analyzed with regard to the NOx raw emissions, and the phases suitable for the evaluation of the method according to the invention can be identified. By means of direct or indirect inference of the magnitude of the present NOx raw emissions and the change thereof with respect to time, it is checked whether the NOx raw emissions are constant, such that in this case the evaluation can take place in the described way. In particular, it is possible to infer steady-state NOx raw emissions if the change with respect to time of the measured SCR efficiency or the change with respect to time of the variable which represents the NOx conversion lies below a predefinable or applicable threshold value. This ensures that the $NH_3$ slippage detection takes place only when a sufficiently steady-state NOx signal is present.

In a further preferred embodiment of the method according to the invention, if a transition from dynamic to steady-state NOx raw emissions can be detected during the overdosing phase, the inference of $NH_3$ slippage takes place only after a predefinable time interval. By means of such an applicable debouncing time, any effects arising on account of the different gas propagation times can be taken into consideration.

The diagnostic method according to the invention can also be used in situations where substantially dynamically fluctuating NOx raw emissions are present. Dynamically fluctuating NOx raw emissions have a corresponding effect in the signal of the SCR efficiency determined from the NOx mass flows upstream and downstream of the SCR catalytic converter. Under these conditions, even before the maximum $NH_3$ storage is reached, the measured SCR efficiency briefly falls at any NOx peak without this having been caused by $NH_3$ slippage. The NOx peaks which occur in such dynamic operating states in the sensor signals upstream and/or downstream of the SCR catalytic converter are taken into consideration according to the invention, such that the diagnosis according to the invention can be carried out even in the case of dynamically fluctuating NOx raw emissions. In transient engine operation, it is not possible for $NH_3$ slippage to be detected on the basis of a single drop in efficiency, because on account of the dynamically fluctuating NOx signal upstream of the SCR catalytic converter (NOx peak), the signal of the measured SCR efficiency or of the measured NOx conversion is subject to intense fluctuations. It is not possible to unequivocally and directly determine whether the drop in efficiency being considered in each case has been caused by a NOx peak or by an increased $NH_3$ concentration. The evaluation according to the invention is based on the concept of considering and evaluating the further profile of the efficiency after a drop or fall in efficiency. If the NOx conversion increases significantly again after a fall in efficiency, it is inferred that no $NH_3$ slippage is present. In the case of a substantially constant or substantially decreasing NOx conversion following a fall in the NOx conversion, it is inferred that $NH_3$ slippage is present. Therefore, if an increase in efficiency, such as would be expected after a NOx peak, does not occur, this is evaluated as a sign of $NH_3$ slippage. If the assumed SCR efficiency increases again following a drop in efficiency, it can be assumed that there is no $NH_3$ slippage or only low, not clearly determinable $NH_3$ slippage.

The fluctuations in the NOx conversion caused by the dynamically fluctuating NOx raw emissions are particularly preferably statistically evaluated, thereby further increasing the reliability of the diagnostic method according to the invention.

The statistical evaluation is carried out preferably in that a decreasing, a constant and an increasing NOx conversion following a fall in the NOx conversion are statistically evaluated by increasing or decreasing a counter. It is inferred that $NH_3$ slippage is present only if a predefinable threshold value for the counter is reached and/or exceeded. In this way, the fall in efficiency and the subsequent possibly occurring increase in efficiency or recovery in efficiency is evaluated, and depending on the result of the evaluation a counter is increased or decreased. The counter may thus be increased if a fall in the SCR efficiency is registered during an applicable delay time. If the SCR efficiency increases again after a local minimum is reached, the counter value can initially be held constant. If, after a local minimum is reached, the SCR efficiency increases for longer than predefined by an applicable delay time, then the counter value is decreased again. The value by which the counter is decreased or increased is preferably predefinable or applicable as a function of the magnitude of the deviation of the present efficiency from the maximum value determined up to that time. If the counter value reaches and/or exceeds a predefinable threshold value, $NH_3$ slippage is finally inferred.

The counter value therefore has the character of a statistically based probability with which $NH_3$ slippage is present. If it is basically presumed that $NH_3$ slippage is present on account of a drop in efficiency, a higher probability for this is indicated by an increasing counter value. An SCR efficiency which increases again after the drop in SCR efficiency contradicts the presumption, such that the probability in the form of the counter value is corrected downward again.

To further increase the reliability of the diagnostic method according to the invention, further conditions may be checked before the counter value is increased. In particular, it may be checked whether the peak height if the in each case most recently observed NOx peak upstream of the SCR catalytic converter lies below an applicable threshold. In the event of extremely high NOx peaks, a direct NOx breakthrough through the SCR catalytic converter may occur, during which the nitrogen oxides are washed past the catalytic converter surface without having previously been absorbed. To exclude these phases from the evaluation, an upper threshold for the peak height or for the change in NOx conversion is predefined.

In a particularly preferred embodiment of the method according to the invention, the method differentiates between the different possible operating states, in particular between steady-state and dynamically fluctuating NOx raw emissions, and permits an evaluation as a function of the respective operating state. To monitor the NOx raw emissions with regard to steady-state or dynamically fluctuating conditions, it is possible, in addition to the NOx mass flow, to also analyze for example the exhaust-gas mass flow. What is of importance here is in each case the change of the selected variables with respect to time. It is for example also possible to evaluate engine-related variables such as for example the speed or the injection quantity, which permit direct or indirect inference of the magnitude of the present NOx raw emissions and the change thereof with respect to time.

By means of a check as to whether steady-state or dynamically fluctuating NOx raw emissions are present, and an evaluation, as a function of said check, for inferring $NH_3$ slippage, particularly effective slippage detection can be realized which is insensitive to the prevailing driving conditions and which therefore allows the diagnostic method according to the invention to be used under a wide variety of conditions. The method according to the invention can thus be carried out both under steady-state conditions and also under dynamically fluctuating conditions with regard to the NOx raw emissions. A different evaluation is carried out depending on the detected conditions with regard to the NOx values upstream and downstream of the SCR catalytic converter and the profile of the SCR efficiency calculated from said values. Depending on the detectable conditions, different enable conditions are provided for the output of an event trigger, which indicates the presence of $NH_3$ slippage under the respective conditions. As soon as one of the two strategies applied in parallel leads to a result, that is to say to the detection of $NH_3$ slippage, then the slippage detection is successfully completed. As a common input signal, after the start of the overdosing phase, the maximum of the measured SCR efficiency is determined preferably continuously. The deviation of the presently measured efficiency from the maximum value attained up to that time is calculated at the same time. Here, in the way described above, the deviation may additionally be corrected as a function of the present catalytic converter temperature and/or the catalytic converter reached at the start of the overdosing phase, in order to allow for the temperature dependency of the maximum attainable SCR efficiency. As soon as the deviation reaches or exceeds a predefinable threshold value, $NH_3$ slippage is detected. Here, the evaluation is made dependent on whether steady-state or dynamically fluctuating NOx raw emissions are present. In this regard, reference is made to the above description.

The invention also encompasses a computer program which carries out all the steps of the method according to the invention when the program is executed on a computer or a control unit. Finally, the invention encompasses a computer program product having program code, which is stored on a machine-readable carrier, for carrying out the method according to the invention when the program is executed on a computer or a control unit. By means of the computer program and the computer program product, the method according to the invention can be used to considerably improve the monitoring of an SCR catalytic converter in that $NH_3$ slippage which occurs at the end of an overdosing phase during the course of a monitoring process which is known per se is detected as soon as it starts to occur both in the case of steady-state and in the case of dynamically fluctuating NOx raw emissions, and the corresponding status message is generated very early. In this way, the $NH_3$ emissions are kept very low, and the characteristic values which are determined during the course of the subsequent emptying test can be determined with greater accuracy and precision. The particular advantage of the computer program and of the computer program product is that the computer program can be implemented and used even in already existing systems, in particular in existing motor vehicles, such that the advantages of the method according to the invention can be utilized in existing vehicles without further components or parts having to be installed.

Further features and advantages of the invention will emerge from the following description of exemplary embodiments in conjunction with the drawings. Here, the individual features may be realized in each case individually or in combination with one another.

DETAILED DESCRIPTION

Figure 1:
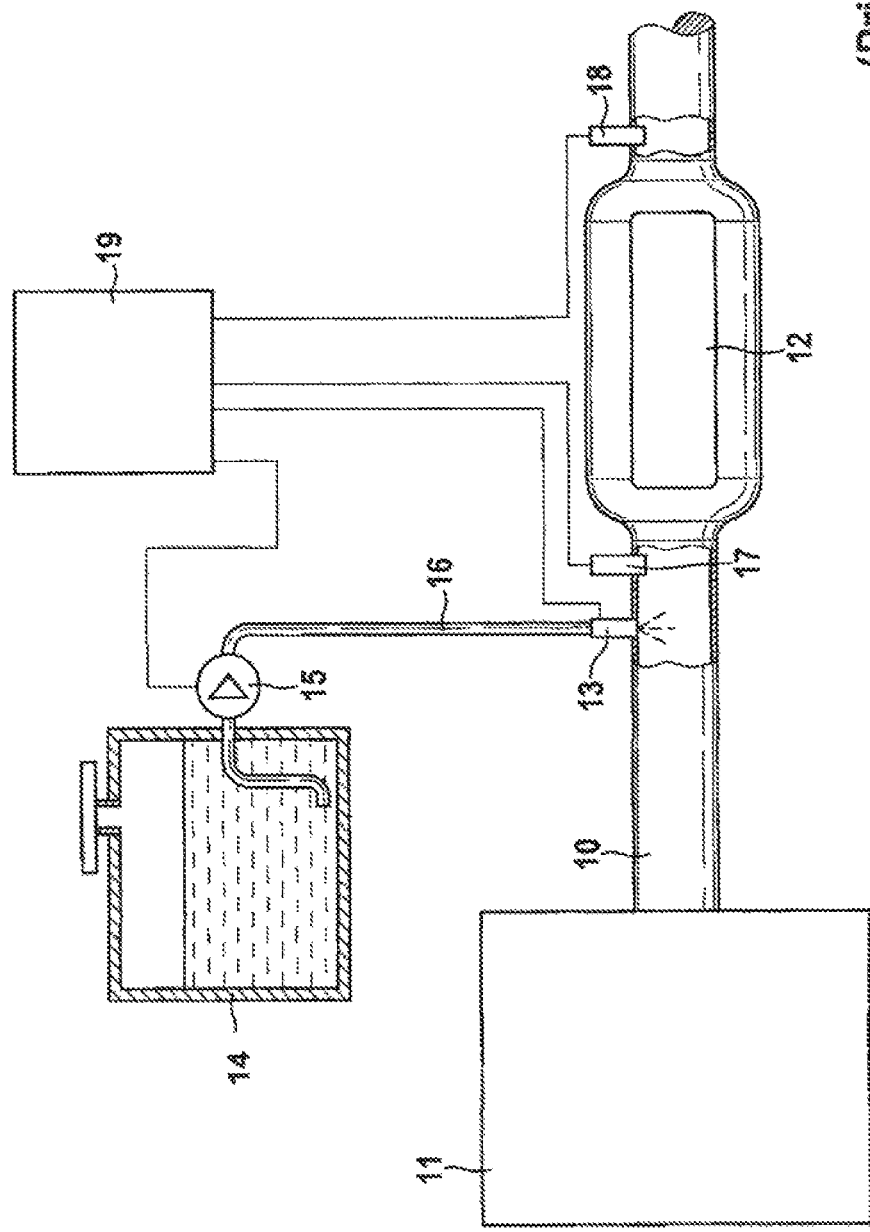
FIG. 1 shows a schematic illustration of the components of an SCR catalytic converter system (prior art)

FIG. 1 firstly schematically shows the components, which are known per se, of a catalytic converter system. Arranged in the exhaust section 10 of an internal combustion engine 11 is an SCR catalytic converter 12 which selectively reduces nitrogen oxides in the exhaust gas by means of a selective catalytic reduction (SCR). For said reaction, ammonia ($NH_3$) is used as reactant. Since ammonia is a toxic substance, said substance is gained from the non-poisonous carrier substance urea. The urea, in the form of liquid urea solution, is injected by means of the dosing device 13 into the exhaust section 10 upstream of the SCR catalytic converter 12. The aqueous urea solution is stored in a reducing agent tank 14 from which the solution is supplied to the dosing device 13 by means of a delivery pump 15 via a pressure line 16. To monitor the nitrogen oxide concentrations, a nitrogen oxide sensor 17 is provided upstream of the SCR catalytic converter 12 and a nitrogen oxide sensor 18 is provided downstream of the SCR catalytic converter 12. The control of the dosing, and the measurement and evaluation of the nitrogen oxide values, take place in an evaluation unit 19, in particular in a control unit of the SCR catalytic converter or a control unit of the internal combustion engine.

Figure 2:
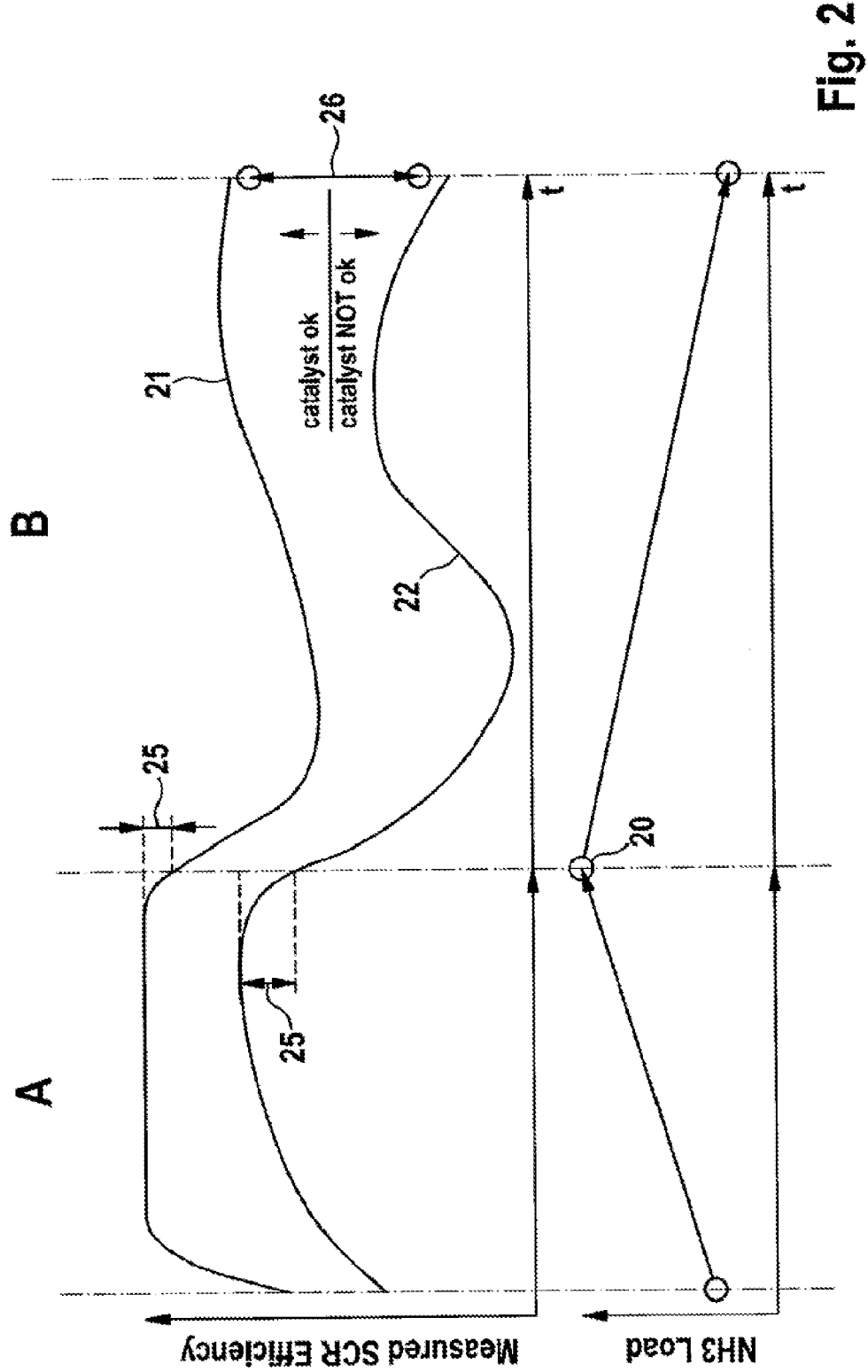
FIG. 2 shows a schematic illustration of the profile with respect to time of the $NH_3$ storage in an SCR catalytic converter (lower part) and of the measured SCR efficiency (upper part) during the monitoring of an SCR catalytic converter.

FIG. 2 schematically shows the profile with respect to time of the loading of the SCR catalytic converter with $NH_3$ ($NH_3$ Load—lower part) and of the measured SCR catalytic converter efficiency (Measured SCR Efficiency—upper part) in a method for monitoring the SCR catalytic converter. Said monitoring method is further improved by means of the method according to the invention. In the method for monitoring the catalytic converter, the capability of the catalytic converter to store $NH_3$ or to absorb $NH_3$ is used as a feature for the aging of or damage to the catalytic converter. The lower part of the figure shows the profile with respect to time of the stored $NH_3$ mass ($NH_3$ Load) in the SCR catalytic converter. In a first phase (overdosing phase A), the SCR catalytic converter is initially filled with reducing agent, by means of a superstoichiometric reducing agent dosing, up to the maximum attainable $NH_3$ storage. A defined starting point for the diagnostic method is attained in this way. The time at which the maximum $NH_3$ storage in the SCR catalytic converter is reached is denoted by 20. When the maximum loading with $NH_3$ is reached, no more $NH_3$ can be stored, such that the $NH_3$ which continues to be dosed leaves the SCR catalytic converter unused. The nitrogen oxide sensor 18 arranged downstream of the SCR catalytic converter detects said $NH_3$ on account of a cross-sensitivity, such that an increased nitrogen oxide signal can be measured. The reducing agent dosing is subsequently reduced in relation to a normal dosing, or is deactivated, in an underdosing phase B, such that the stored $NH_3$ mass is gradually depleted again by the NOx conversion taking place in the SCR catalytic converter (emptying test). During said underdosing phase, the SCR efficiency is measured on the basis of the nitrogen oxide signals from the nitrogen oxide sensors 17 and 18 arranged upstream and downstream of the SCR catalytic converter 12, and from this, the usable $NH_3$ storage capacity of the SCR catalytic converter is indirectly determined. Instead of the measured SCR efficiency as illustrated in FIG. 2, it is also possible to analyze other characteristic values which are dependent on the NOx conversion rate of the SCR catalytic converter. The curve 21 shows the behavior of a new or fully functional catalytic converter with adequate $NH_3$ storage capacity (catalyst ok). The curve 22 shows the behavior of an aged SCR catalytic converter with an insufficient $NH_x$ storage capacity (catalyst NOT ok). At the end of the overdosing phase A, the measured SCR efficiency falls. At this time, the signal from the nitrogen oxide sensor 18 arranged downstream of the SCR catalytic converter increases as a result of the $NH_3$ which can no longer be stored in the SCR catalytic converter. This increase in the signal from the cross-sensitive nitrogen oxide sensor is manifested in the decreasing measured NOx conversion rate (measured efficiency). The fall in the SCR efficiency, denoted in FIG. 2 by 25, indicates the end of the overdosing phase A. The transition into the underdosing phase B thereupon takes place, within which underdosing phase characteristic values are determined which are dependent on the NOx conversion rate and from which the usable $NH_3$ storage capacity is indirectly determined. The determination of said characteristic values 26 is schematically indicated in FIG. 2.

The method according to the invention is based on said monitoring method, and here improves the slippage detection 25. By means of continuous observation and evaluation of the measurable NOx conversion on the basis in particular of the cross-sensitive nitrogen oxide sensor arranged downstream of the SCR catalytic converter during the overdosing phase A, $NH_3$ slippage is detected as soon as it starts to occur, and a corresponding status message is generated even at very low $NH_3$ concentrations downstream of the SCR catalytic converter, such that an early switch can be made into the underdosing phase B. This method according to the invention has the advantage that the $NH_3$ emissions are kept as low as possible and that the point of maximum $NH_3$ storage in the SCR catalytic converter is determined as precisely as possible, in order to be able to provide a very precise and reliable reference point for the determination, which takes place in the emptying test (underdosing phase B), of characteristic values for analyzing the SCR catalytic converter or the $NH_3$ storage capacity thereof.

This method can be carried out both in the case of steady-state, that is to say substantially constant NOx raw emissions, and also in the case of dynamically fluctuating NOx raw emissions. It is preferable for this purpose for one or more suitable operating variables to be evaluated in order to be able to carry out an evaluation of the NOx raw emissions with regard to steady-state or transient conditions. The evaluation of the method according to the invention for detecting $NH_3$ slippage is carried out in a manner dependent on whether steady-state or transient NOx raw emissions are present.

Figure 3:
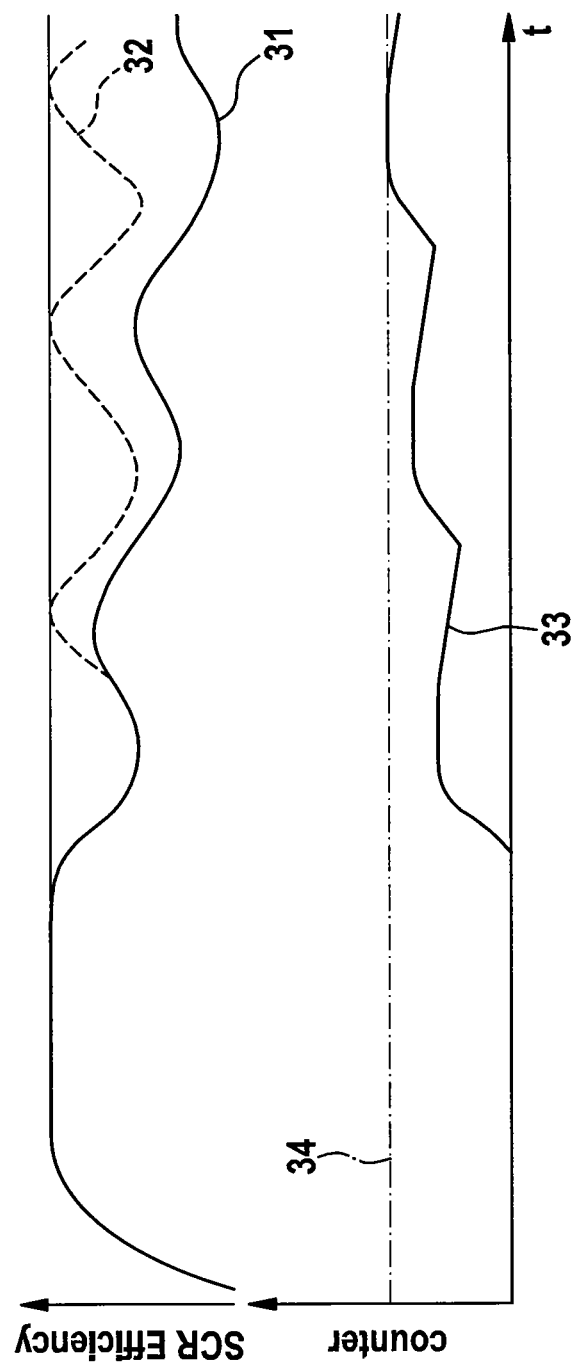
FIG. 3 shows a schematic illustration of the profile with respect to time of the SCR efficiency in the case of dynamically fluctuating NOx raw emissions, according to a preferred embodiment of the method according to the invention.

FIG. 3 illustrates the implementation of the method according to the invention in the case of transient, that is to say dynamically fluctuating NOx raw emissions. The figure shows the profile with respect to time of the measured SCR catalytic converter efficiency (SCR Efficiency—upper region) and of the statistical evaluation thereof (lower region) during the overdosing phase A. In the case of the dynamically fluctuating NOx raw emissions present here, it is not possible for $NH_3$ slippage to be detected on the basis of a single drop in efficiency, because on account of the dynamically fluctuating NOx signal upstream of the SCR catalytic converter (NOx peak), the signal of the measured SCR efficiency or of the measured NOx conversion is continuously subject to intense fluctuations. As a result of the cross-sensitivity of the nitrogen oxide sensor arranged downstream of the SCR catalytic converter, is not possible to unequivocally determine whether the drop in efficiency being considered in each case has been caused by a NOx peak or by an increased $NH_3$ concentration. According to the invention, therefore, the measured drop in efficiency is evaluated in that the drop in efficiency is evaluated as $NH_3$ slippage only if the efficiency does not increase significantly again after the drop in efficiency. If the increase in efficiency does not occur after a NOx peak, this is evaluated as a sign of $NH_3$ slippage. To increase the reliability of this information, a statistical evaluation is preferably carried out, as indicated in the lower section of FIG. 3.

The profile 31 shows the sequence of a plurality of drops in efficiency on account of NOx peaks with the simultaneous presence of $NO_x$ slippage. The profile 32 shows the profile of a plurality of drops in efficiency on account of NOx peaks without $NH_3$ slippage. In both cases, it is possible to see a certain recovery of the efficiency after the respective drop in efficiency. However, said recovery or said increase in efficiency is considerably less pronounced when $NH_3$ slippage is simultaneously present (profile 31) than without $NH_3$ slippage (profile 32). In the case of a substantially constant or substantially falling NOx conversion (profile 31) following a fall in the NOx conversion or a drop in efficiency, it is thus concluded that $NH_3$ slippage is present.

A statistical evaluation of said profiles may take place by means of a counter (Counter), as is schematically illustrated in the lower section of FIG. 3. Here, the fall in efficiency and the subsequent increase is evaluated, and the counter is increased or decreased depending on the result of the evaluation. If a fall in the SCR catalytic converter efficiency is registered during an applicable delay time, then the counter is increased. This is indicated in FIG. 3 by the profile 33 of the statistical counter. The value by which the counter is increased is preferably applicable as a function of the deviation of the present efficiency from the maximum value of the efficiency determined up to that time. If the efficiency increases again after a local minimum is reached, then the counter value is initially kept constant. If, after the local minimum is reached, the SCR efficiency increases for longer than predefined by an applicable delay time, then the counter value is decreased again. In this case, it is not assumed that $NH_3$ slippage is present, because the efficiency recovers again after every fall. If the counter value reaches a predefinable threshold, indicated in FIG. 3 by the dash-dotted line 34, then it is inferred that $NH_3$ slippage is present.

The increase of the counter may be made dependent on whether additional conditions are present, in order thereby to further increase reliability. For example, it may be provided as a condition that the peak height of the in each case most recently observed NOx peak measurable upstream of the SCR catalytic converter lies below an applicable threshold, because in the event of extremely high NOx peaks, a direct NOx breakthrough through the SCR catalytic converter may occur. This situation is preferably excluded from the evaluation according to the invention of the signals. Furthermore, it may be provided that the NOx raw emissions, which are measured, must be high enough to be able to eliminate miscalculations on account of sensor or model tolerances.

The invention claimed is:

1. A method for monitoring an SCR catalytic converter (12), in which method the $NH_3$ storage capacity of the SCR catalytic converter (12) is monitored, with the SCR catalytic converter (12) initially being filled in an overdosing phase with a superstoichiometric reducing agent dosing up to the maximum NH3 storage capacity, subsequently being acted on in an underdosing phase with a reducing agent dosing which is reduced or is eliminated in relation to a normal dosing, and with the NH$_3$ storage capacity being indirectly determined during the underdosing phase by determining at least one characteristic value which is dependent on the NO$_x$ conversion rate, characterized by continuously measuring, during the overdosing phase, a variable which is characteristic of the NOx conversion, and inferring that NH$_3$ slippage (25) is present, indicating a transition from the overdosing phase to the underdosing phase, when the NOx conversion falls.

2. A method according to claim 1, characterized by determining the variable which is characteristic of the NOx conversion on the basis of measured values from at least one NOx sensor (18) arranged downstream of the SCR catalytic converter (12), with the characterizing variable being the efficiency of the SCR catalytic converter (12).

3. A method according to claim 2, characterized in that the efficiency of the SCR catalytic converter (12) is determined on the basis of measured values from a NOx sensor (17) arranged upstream of the SCR catalytic converter and measured values from the NOx sensor (18) arranged downstream of the SCR catalytic converter.

4. A method according to claim 2, characterized by continuously determining, during the overdosing phase, the maximum measured efficiency of the SCR catalytic converter (12) and concurrently measuring the deviation of the presently measured efficiency of the SCR catalytic converter (12) from the maximum, and inferring that NH$_3$ slippage (25) is present if the deviation exceeds a predefinable threshold value.

5. A method according to one claim 1, characterized by measuring a catalytic converter temperature during the measurement of the variable which is characteristic of the NOx conversion, and considering said catalytic converter temperature in the evaluation.

6. A method according to claim 1, characterized by checking, as a prerequisite for the detection of NH$_3$ slippage (25), whether the change with respect to time of the NOx mass flow measurable downstream of the SCR catalytic converter exceeds a predefinable threshold value.

7. A method according to claim 1, characterized by checking, as a prerequisite for the detection of NH$_3$ slippage (25), whether the NOx mass flows measurable upstream and/or downstream of the SCR catalytic converter lie above a predefinable threshold value.

8. A method according to claim 1, characterized in that the method is carried out with substantially steady-state NOx raw emissions, wherein the change with respect to time of engine-related variables, are/is taken into consideration for evaluating whether steady-state conditions are present.

9. A method according to claim 8, characterized in that the engine-related variables are the exhaust-gas mass flow and/or the NOx mass flow.

10. A method according to claim 8, characterized in that the engine-related variables are an engine speed and/or an injection quantity.

11. A method according to claim 1, characterized by inferring that steady-state NOx raw emissions are present if the change with respect to time of the variable which represents the NOx conversion lies below a predefinable threshold value when the method is carried out with substantially steady-state NOx raw emissions.

12. A method according to claim 1, characterized by delaying a predefinable time interval before inferring NH$_3$ slippage (25) and detecting a transition from dynamic to steady-state NOx raw emissions during the overdosing phase.

13. A method according to claim 1, characterized by inferring that no NH$_3$ slippage is present if a renewed increase in NOx conversion occurs following a fall in the NOx conversion (32) during dynamically fluctuating NOx raw emissions, and inferring that, NH$_3$ slippage is present if a NOx conversion is substantially constant or substantially decreasing following a fall in the NOx conversion (31).

14. A method according to claim 13, characterized in that the fluctuations in the NOx conversion are statistically evaluated (33).

15. A method according to claim 13, characterized in that a decreasing, a constant, and an increasing NOx conversion, following a fall in the NOx conversion, is statistically evaluated by increasing or decreasing a counter (33), and in that NH$_3$ slippage is inferred to be present if a predefinable threshold value (34) for the counter is reached and/or exceeded.

16. A method according to claim 15, characterized in that a value by which the counter is increased or decreased is predefined as a function of the magnitude of the change in the variable which characterizes the NOx conversion.

17. A method according to claim 13, characterized by checking whether the fall in the NOx conversion lies below a predefinable threshold prior to concluding that NH$_3$ slippage is present.

18. A method according to claim 1, characterized by evaluating whether NH$_3$ slippage is present as a function of whether steady-state NOx raw emissions or dynamically fluctuating NOx raw emissions are present.

19. A computer program product having program code for execution executed on a computer or a control unit (19), the program code stored on a non-transient machine-readable carrier for carrying out a method of monitoring an SCR catalytic converter (12), in which method the NH$_3$ storage capacity of the SCR catalytic converter (12) is monitored, with the SCR catalytic converter (12) initially being filled in an overdosing phase with a superstoichiometric reducing agent dosing up to the maximum NH$_3$ storage capacity, subsequently being acted on in an underdosing phase with a reducing agent dosing which is reduced or eliminated in relation to a normal dosing, and with the NH$_3$ storage capacity being indirectly determined during the underdosing phase by determining at least one characteristic value which is dependent on the NO$_x$ conversion rate, characterized by continuously measuring a variable which is characteristic of the NOx conversion during the overdosing phase, and inferring that NH$_3$ slippage (25) is present, indicating a transition from the overdosing phase to the underdosing phase, when the NOx conversion falls.

\* \* \* \* \*